(12) United States Patent
Faust

(10) Patent No.: US 8,597,817 B2
(45) Date of Patent: Dec. 3, 2013

(54) BIPOLAR BATTERY AND PLATE

(75) Inventor: Thomas Faust, Wyomissing, PA (US)

(73) Assignee: East Penn Manufacturing Co., Inc., Lyon Station, PA (US)

( * ) Notice: Subject to any disclaimer, the term of this patent is extended or adjusted under 35 U.S.C. 154(b) by 264 days.

(21) Appl. No.: 13/229,331

(22) Filed: Sep. 9, 2011

(65) Prior Publication Data

US 2013/0065104 A1 Mar. 14, 2013

(51) Int. Cl.
*H01M 2/16* (2006.01)
*H01M 6/42* (2006.01)
*H01M 4/64* (2006.01)
*H01M 4/02* (2006.01)

(52) U.S. Cl.
USPC ............ 429/144; 429/142; 429/149; 429/233

(58) Field of Classification Search
USPC .................................. 429/142, 144, 149, 233
See application file for complete search history.

(56) References Cited

U.S. PATENT DOCUMENTS

| | | |
|---|---|---|
| 715,413 A | 12/1902 | Paget |
| 3,723,181 A | 3/1973 | Oakley |
| 3,738,871 A | 6/1973 | Scholle |
| 3,819,412 A | 6/1974 | Taylor et al. |
| 4,098,967 A | 7/1978 | Biddick et al. |
| 4,225,654 A | 9/1980 | Tajima et al. |
| 4,275,130 A | 6/1981 | Rippel et al. |
| 4,542,082 A | 9/1985 | Rowlette |
| 4,900,643 A | 2/1990 | Eskra et al. |
| 5,334,464 A | 8/1994 | Rowlette |
| 5,510,211 A | 4/1996 | Sundberg et al. |
| 5,618,641 A | 4/1997 | Arias |
| 6,077,623 A | 6/2000 | Grosvenor et al. |
| 6,511,766 B1 | 1/2003 | Loutfy et al. |
| 6,576,365 B1 | 6/2003 | Meitav et al. |
| 7,201,986 B2 | 4/2007 | McLean |
| 7,419,720 B2 | 9/2008 | Hofmann et al. |
| 2001/0006745 A1 | 7/2001 | Bronoel et al. |

(Continued)

FOREIGN PATENT DOCUMENTS

| | | | | |
|---|---|---|---|---|
| JP | 56149776 A | * 11/1981 | ............ | H01M 10/18 |
| JP | 59121787 A | 7/1984 | | |

OTHER PUBLICATIONS

English Abstract of JP 56149776 A, Shimizu, Kazuharu, Nov. 1981.*
Advanced Battery Concepts Newsletter, Green Seal, Our Batteries, About Us Management Team, Home, 5 pages.

(Continued)

*Primary Examiner* — Kenneth Douyette
(74) *Attorney, Agent, or Firm* — Barley Snyder

(57) ABSTRACT

A bipolar battery plate is utilized for production of a bipolar battery. The bipolar battery plate includes a frame, a substrate, a conductor, a filler, first and second lead layers, and positive and negative active materials. The substrate is positioned within the frame and includes a plurality of perforations that are sealed by a filler, with the conductor positioned in the perforation and held by the filler. The conductor connects to the plurality of perforations. The first lead layer positioned on one side of the substrate, while the second lead layer positioned on another side of the substrate. The first and second lead layers electrically connected to each other through the filler. The positive active material (PAM) positioned on a surface of the first lead layer, while the negative active material (NAM) positioned on a surface of the second lead layer.

58 Claims, 7 Drawing Sheets

(56) References Cited

U.S. PATENT DOCUMENTS

2002/0160264 A1   10/2002   Bronoel et al.
2003/0219646 A1   11/2003   LeCostaouec
2009/0053601 A1    2/2009   Kelley
2009/0081541 A1    3/2009   Kelley
2010/0183920 A1    7/2010   Shaffer, II et al.

OTHER PUBLICATIONS

Advanced Battery Concepts, LLC Generation 1 Prototype Results, Ed Shaffer and Bill Brecht, Published data from Atraverda, Proceedings of the 23rd IPSS Meeting, Amsterdam, Sep. 2003, GreenSeal Bipolar Assemblies, Gen 1 Prototype, Discharge Curve, GreenSeal U1 Wheelchair Battery, 5 pages.

* cited by examiner

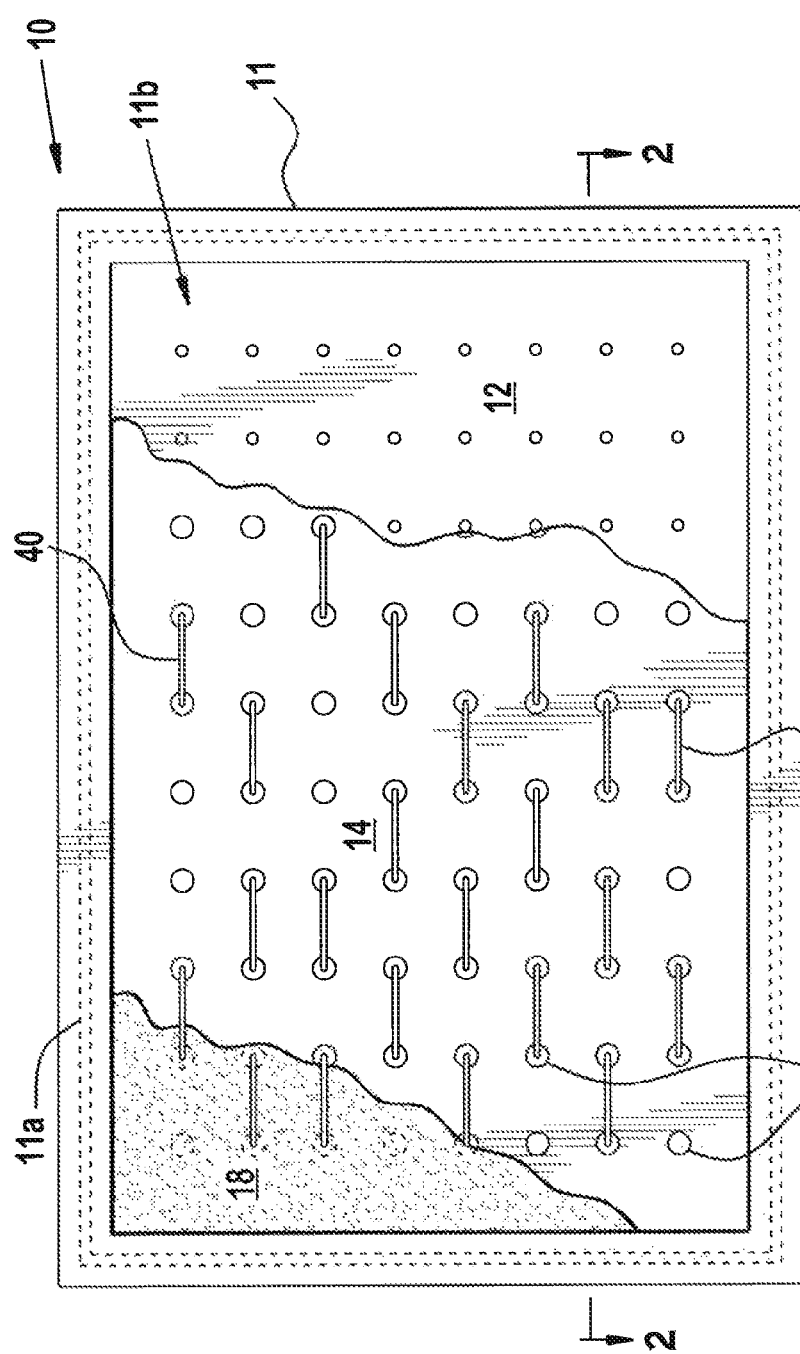
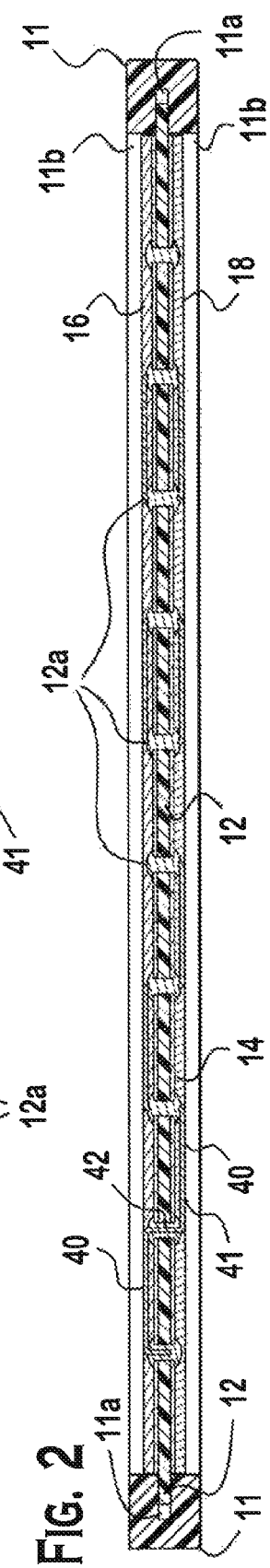
FIG. 1
FIG. 2

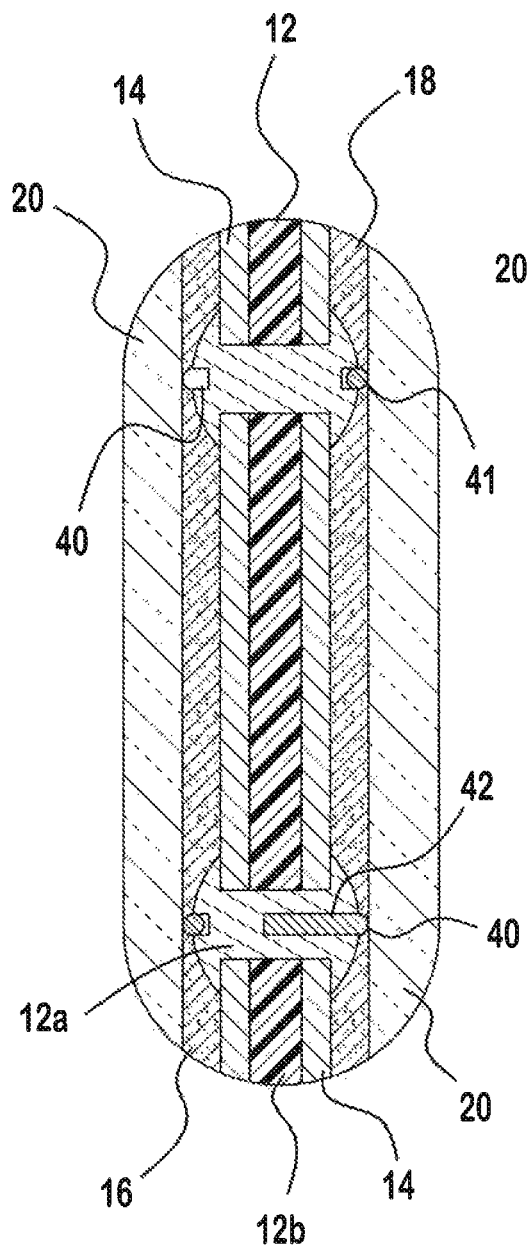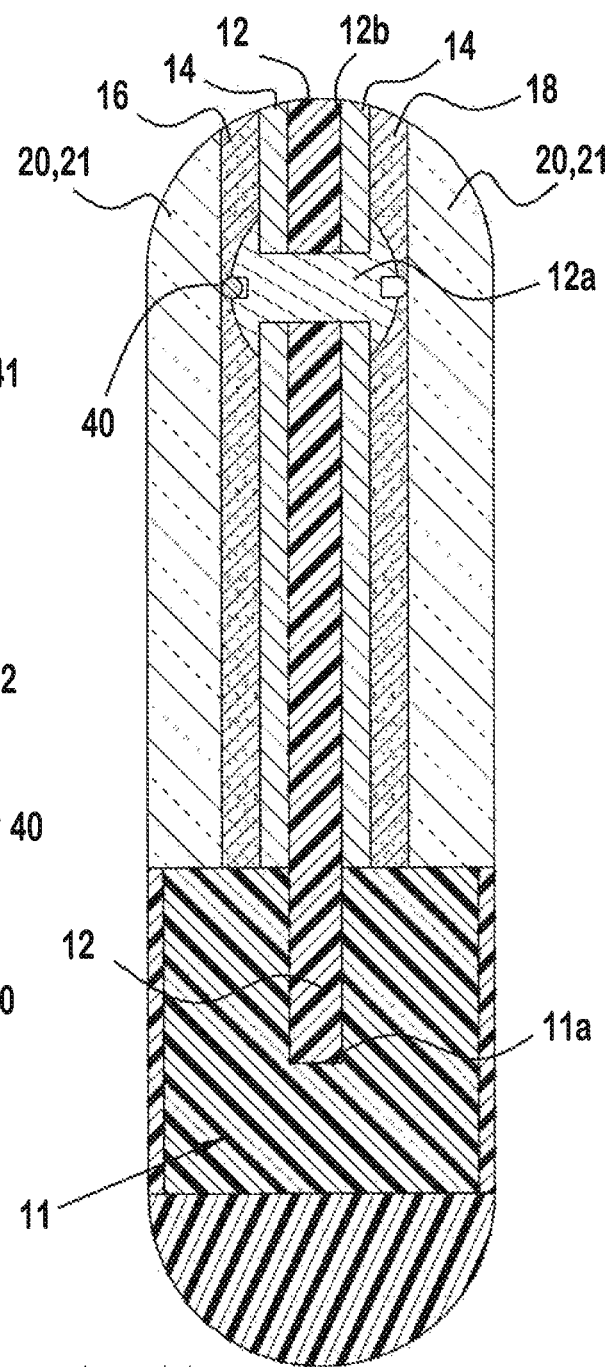
FIG. 6
FIG. 7

BIPOLAR BATTERY AND PLATE

FIELD OF THE INVENTION

The invention relates to a battery and in particular to a bipolar battery having a series of bipolar battery plates.

BACKGROUND

A conventional bipolar battery generally includes electrodes having a metallic conductive substrate on which positive active material forms one surface and negative active material forms the opposite surface. The active materials are retained by various means on the metal conductive substrate which is nonconductive to electrolyte ions. The electrodes are arranged in parallel stacked relation to provide a multi-cell battery with electrolyte and separator plates that provide an interface between adjacent electrodes. Conventional monopolar electrodes, used at the ends of the stack are electrically connected with the output terminals. Most bipolar batteries developed to date have used metallic substrates. Specifically, bipolar lead-acid systems have utilized lead and alloys of lead for this purpose. The use of lead alloys, such as antimony, gives strength to the substrate but causes increased corrosion and gassing.

In most known plates for bipolar batteries, the positive active material, usually in the form of a paste is applied to the metallic conductive substrate on one side while the negative active material is similarly applied to the opposite side. The plates may be contained by a frame which seals the electrolyte between plates so that it cannot migrate through the plate.

In U.S. Pat. No. 4,275,130, a bipolar battery construction 20 is disclosed having a plurality of conductive biplates 21. Each bipolar plate 21 may include a composite, substrate sheet 34 including a continuous phase resin material, which is nonconductive to electrolyte ions. The composite substrate sheet 34 also includes uniformly distributed, randomly dispersed conductive fibers 33 embedded in the material. The binder resin is a synthetic organic resin and may be thermosetting or thermoplastic. The composite substrate sheet 34 has substantially flat opposite side faces 35 which include at their surfaces exposure of portions of the embedded graphite fibers 33. The embedded graphite fibers not only provide electrical conductivity through the substrate sheet 34, but also impart to thermoplastic material a high degree of stiffness, rigidity, strength and stability. Substrate sheet 34 may be made in any suitable mariner such as by thoroughly intermixing the thermoplastic material in particle form with the graphite fibers. The mixture is heated in a mold and then pressure formed into a substrate sheet of selected size and thickness. After the sheet has been cured, the substantially flat side faces 35 may be readily treated or processed, as for example by buffing, to eliminate pinholes or other irregularities in the side faces.

As disclosed, lead stripes are bonded to the composite substrate sheet 34 by known plating processes. On the positive side face 35, the facial areas between lead stripes 38 are covered by a coating of corrosion resistant resin 36 suitably a fluorocarbon resin such as Teflon (polytetrofluoroethylene) which protects against anodic corrosion of the adjacent graphite fibers and polyethylene of the substrate 34. On the negative side face 35, facial areas between lead stripes 37 may be protected by a thin coating of resin impermeable to electrolyte such as a polyethylene coating 36a. In fabrication of the bipolar plate 21 and after the composite substrate sheet 34 has been formed, a thin Teflon sheet may be bonded to the positive side surface 35. Prior to bonding, window like openings corresponding in length and width to the lead stripes are cut. Plating thereafter will bond the lead in stripes 38 to the exposed conductive graphite surfaces on the substrate side face 35. The same fabrication process may be utilized on the negative side face 35 to coat the nonstriped areas with polyethylene or other like material. Plating of the negative stripes may be achieved as with the positive stripes.

A separator plate 23 serves to support the positive active material 24 and the negative active material 25 and may be made of a suitable synthetic organic resin, preferably a thermoplastic material such as microporous polyethylene.

Battery construction 20 includes a plurality of conductive bipolar plates 21, peripheral borders or margins thereof being supported and carried in peripheral insulating casing members 22. Interleaved and arranged between bipolar plates 21 are a plurality of separator plates 23 The separator plates carry positive active material 24 on one side thereof and negative active material 25 on the opposite side thereof. The casing members 22, together with the bipolar plates 21 and separator plates 23, provide chambers 26 for containing electrolyte liquid. At each end of battery construction 20, standard bipolar plates 21 interface with current collecting plates, where 27 is the negative collector plate and 28 is the positive collector plate. Externally of end collectors 27 and 28 are provided pressure members 30 interconnected by rods 31 having threaded portions for drawing the pressure members plates together and applying axial compression to the stacked arrangement of bipolar plates and separator plates.

The bipolar plate 21 is lightweight, rigid, but includes joint lines between the lead stripe edges and protective coatings to resist corrosion and structural deterioration of the substrate. Furthermore, a plating process is required in order to bond the lead stripes 37, 38 to the conductive substrate having graphite fibers. Conductivity is limited by the size and amount type of graphite fibers in the substrate. Additionally, a plurality of bipolar plates 21 and layers are required to sit in separate casing members 22 and an external frame, all of which require further processing steps for more parts. The bipolar battery construction 20 is a complicated design having many layers of materials and substrates assembled in multiple chambers 26 and bodies 43 that are secured together by a complex external frame.

SUMMARY

It is an object of the present invention, among other objects, to provide a bipolar battery having a simplified bipolar plate design, wherein the active materials are encased within an insulated frame having a substrate with perforations to improve conductivity between the active materials. Furthermore, the bipolar battery is inexpensive to produce and does not require a complex external frame to support the bipolar plates.

The bipolar battery plate is utilized for production of the bipolar battery. The bipolar battery plate includes a frame, a substrate, a conductor, a filler, first and second lead layers, and positive and negative active materials. The substrate is positioned within the frame and includes a plurality of perforations that are sealed by a filler, with the conductor positioned in the perforation and held by the filler. The conductor connects to the plurality of perforations. The first lead layer positioned on one side of the substrate, while the second lead layer positioned on another side of the substrate. The first and second lead layers electrically connected to each other through the filler. The positive active material (PAM) positioned on a surface of the first lead layer, while the negative active material (NAM) positioned on a surface of the second lead layer.

BRIEF DESCRIPTION OF THE DRAWINGS

The invention is explained in more detail below with reference to the Figures shown in the drawings, which illustrate exemplary embodiments of the present invention wherein:

FIG. 1 is a front view of a bipolar plate according to the invention;

FIG. 2 is a sectional view of the bipolar plate taken along the line 2-2 of FIG. 1;

FIG. 6 is a close up view of the bipolar plate according to the invention showing a perforated printed circuit board and filler positioned there through; and FIG. 7 is another close up view of the bipolar plate according to the invention, showing a nonconductive frame of the bipolar plate.

DETAILED DESCRIPTION OF THE EMBODIMENT(S)

Figure 3:
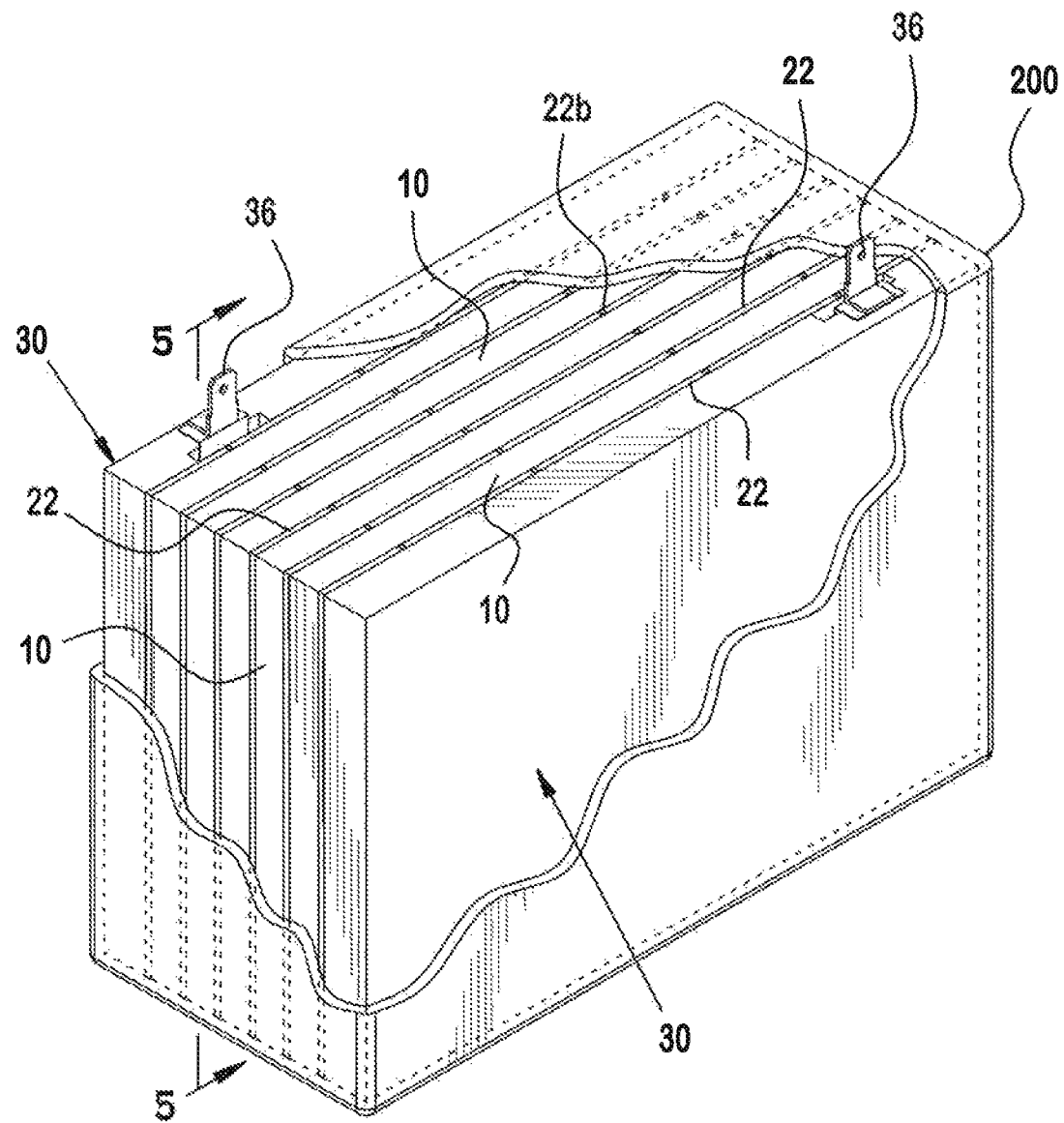
FIG. 3 is a perspective view of a bipolar battery according to the invention.

The invention is explained in greater detail below with reference to the drawings, wherein like reference numerals refer to the like elements. The invention may, however, be embodied in many different forms and should not be construed as being limited to the embodiments set forth herein; rather, these embodiments are provided so that the description will be thorough and complete, and will fully convey the concept of the invention to those skilled in the art.

With respect to FIGS. 1-9, a bipolar battery 100 according to the invention includes a plurality of bipolar plates 10, spacers 22 holding an electrolyte 20, and terminal sections 30. Each of these components are stacked together to complete a bipolar battery 100 according to the invention, which is an adaptable design with minimal number of parts devoid a complex exterior support structure.

Now with reference to FIGS. 1 and 2, a bipolar plate 10 according to the invention is discussed. The bipolar plate 10 includes a frame 11, a printed circuit board (PCB) 12, a plurality of perforations 13 along and extending through a front and rear surface of the PCB 12, lead foils 14, a first active material 16, a second active material 18, and a plurality of conductors 40 positioned into a filler 12a sealing perforations from one side of the PCB 12 through another side of PCB 12.

In general, the PCB 12, lead foils 14, first active material, 16 and second active material are encased within the frame 11, which provides support and protection for the bipolar plate 10. The PCB 12 having the plurality of perforations 13 is positioned in a center of the frame 11, and the lead foils 14 are positioned on both sides of the PCB 12. If positioning of the lead foils 14 covers the plurality of perforations 13, then lead foils 14 will be modified such that the plurality of perforations 13 in the PCB 12 are exposed. Conductors 40 are held in place by the filler 12a, which may be conductive or insulative. The filler 12a, such as metal alloy (i.e. solder), is positioned in and extending through the plurality of perforations 13. The conductor 40 may also further extend from one surface side of the PCB 12 through the perforations 13 to another side of PCB 12, or the conductors 40 may be isolated to one side of the PCB 12. In the embodiment shown, the filler 12a would extend through the perforations 13 and over the outer surfaces of the lead foils. The active materials 16, 18 are then positioned over the lead foils 14 and the filler 12a, as well as the conductors.

The frame 11 is non-conductive. In the embodiment shown, the frame 11 is a moldable insulative polymer, such as polypropylene, acrylonitrile butadiene styrene (ABS), polycarbonate, copolymers, or polymer blends. Because the frame 11 is moldable, the number of shape and size configurations are abundant, which provides a bipolar plate 10 according to the invention that can be tailored to different uses.

In the embodiment shown, the frame 11 has a generally rectangular shape, which provides support for the PCB 12 when positioned in the frame 11. The frame 11 is a casing for the bipolar plate 10, as well as the bipolar battery 100. The outer surface of the frame 11 is the outer surface of the bipolar plate 10 and bipolar battery 100. The surface of the frame 11 is generally flat, and in particular, along the exterior surfaces of the frame 11. The frame 11 supports itself, as well as the bipolar plate 10 when assembled with the spacers 22 and terminals sections 30, especially when the bipolar plate 10 sits upright against a flat opposing surface.

The frame 11 further includes substrate receiving passageways 11a and material receiving passageways 11b, as shown in FIG. 2. The substrate receiving passageways 11a are grooves or channels, while the material receiving passageways 11b are openings in the frame 11 that receive the lead foils 14 and active materials 16, 18 on both stackable side of the bipolar plate 10.

The substrate receiving passageways 11a is a groove used to receive and secure the PCB 12, when the PCB 12 is positioned within the frame 11. Other configurations of substrate receiving passageways 11a are possible, including notches, indentations, recesses or any securing mechanism that secures the PCB 12 within the frame 11. For instance, the PCB 12 could be secured to the frame 11 using a weld or by adhesive, or by a fastener. However, in the embodiment shown, the PCB 12 is secured in the substrate receiving passageways 11a during manufacturing the bipolar plate 10.

Each material receiving passageway 11b is positioned in a substantial center of the frame 11 split from each other by the PCB 12, when the PCB 12 is positioned within the substrate receiving passageways 11a. Furthermore, the lead foils 14 and active materials 16, 18 are encased within an outer surface plane of the frame 11. These pair of cavities are dimensioned to securely receive the lead foils 14 and active materials 16, 18 within the frame 11.

In the embodiment shown, the PCB 12 is a separate substrate with respect to the frame 11, with the PCB 12 being received and secured within the substrate receiving passageways 11a of the frame 11. However, the frame 11 and PCB 12 can be formed together, as a monolithic structure, generally from the same material. During manufacturing, the frame 11 and the PCB 12 are constructed as one piece from the same material. This can be performed through a process such as insert molding, or other known manufacturing methods.

The PCB 12 in the embodiment shown is a known printed circuit board having at least one conductive layer positioned on top of a middle non-conductive layer. In the embodiment shown, there are two conductive layers secured to a middle non-conductive layer using an adhesive such as epoxy resin. The PCB may or may not include existing conductive pathways and/or vias. The plurality of perforations 13 may include these vias or supplemental holes manufactured into the PCB 12. As briefly discussed above, the PCB 12 may be prepared with the frame 11 as a one piece construction.

During manufacturing, the PCB 12 is either insert molded into the substrate receiving passageways 11a, or the frame 11 is over molded over the PCB 12. However, if the frame 11 and the PCB 12 are moldable together, i.e. insert or over molding two pieces together or injection molding one monolithic piece, the manufacturing steps of the bipolar plate 10 can be simplified, with less parts. Furthermore, this process allows the ability to customize the size and shapes of the bipolar plate 10 and bipolar battery 100 according to the invention.

Now with reference back to FIGS. 1 and 2, the PCB 12 shown in detail in FIGS. 6 and 7 includes perforations 13 along the surface of the PCB 12, and through the body extending through an opposite surface. In the embodiment shown, the perforations 13 are circular, but could otherwise be any shape. The perforations 13 are positioned in a symmetrical grid pattern in the embodiment shown, but could be asymmetrical or random, especially if the plurality of perforations 13 are compiled from existing vias in the PCB 12. Having a number of perforations 13 positioned in a symmetrical grid arrangement provides even conductions through the PCB 12 when lead foils 14 are positioned on the opposite sides of the PCB 12, and the metal allow 12a is positioned in and extending through the plurality of perforations 13.

Figure 8:
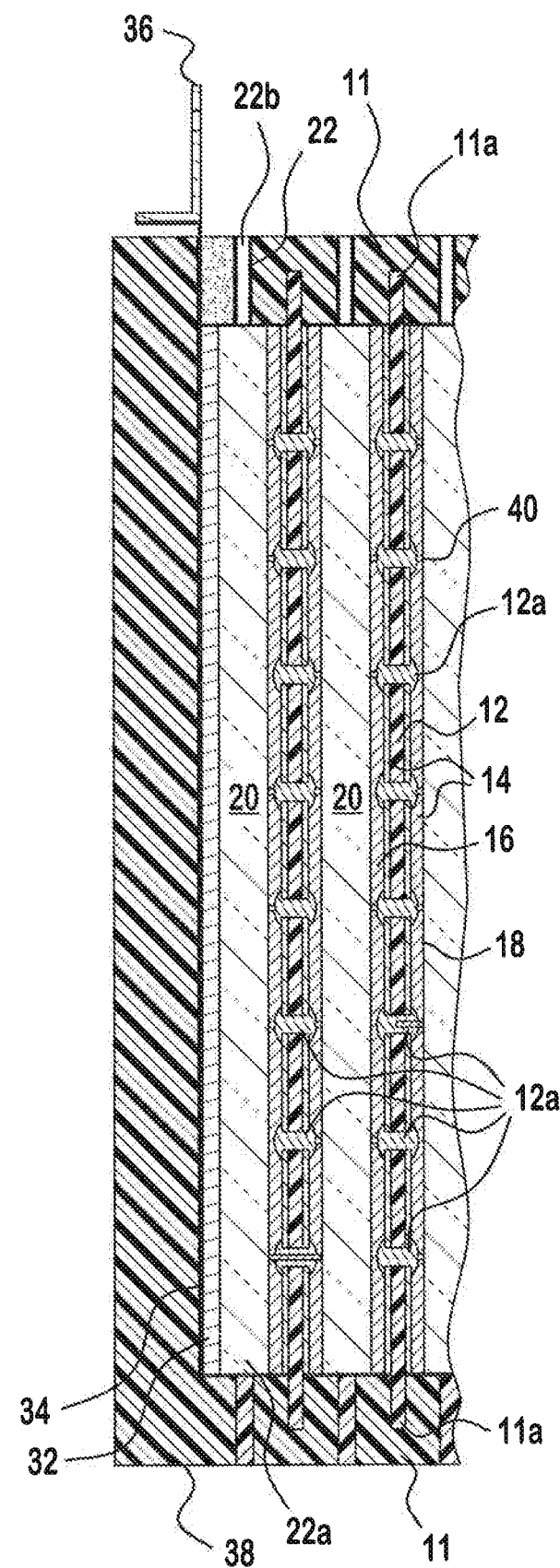
FIG. 8 is another close up view of the bipolar plate according to the invention, showing another non-conductive frame of the bipolar plate.
Figure 9:
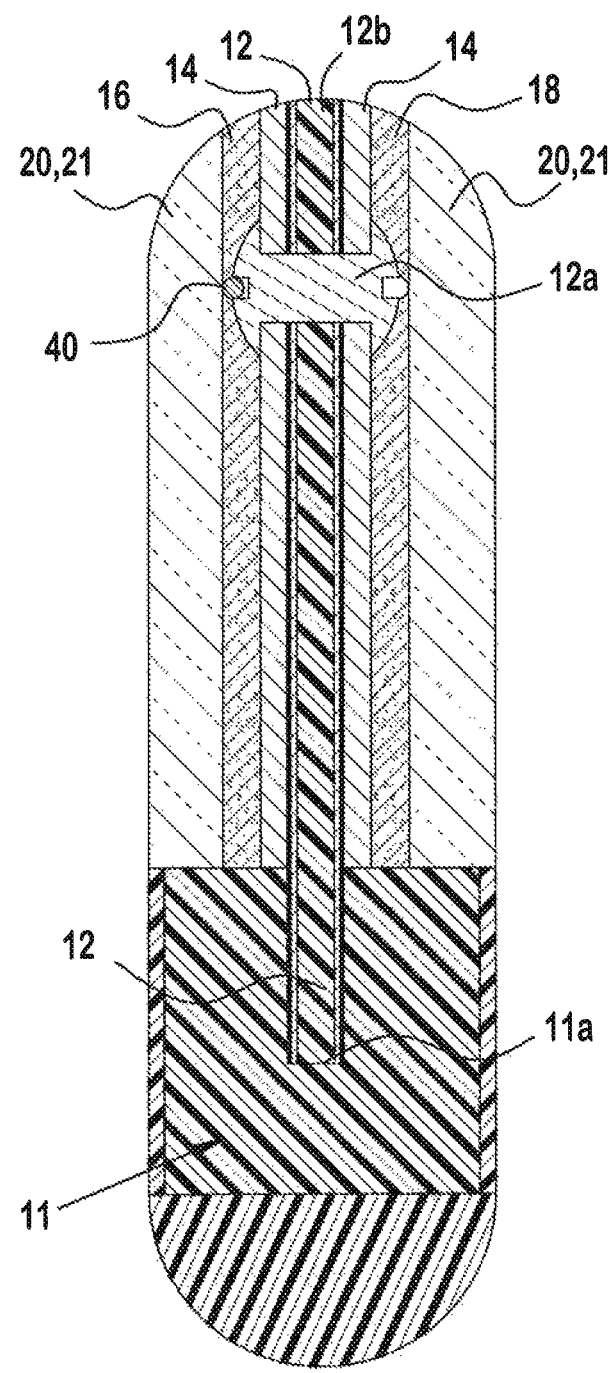
FIG. 9 is a close up view of another bipolar plate according to the invention, showing a nonconductive frame of the bipolar plate.

Now with reference to FIGS. 1, 2, 5-8, the lead foils 14 will be discussed, which are positioned within the material receiving passageway 11b, on opposite sides of the PCB 12. The lead foils 14 are conductive and connect with each other through the metal allow 12a positioned in and through perforations 13. As a result, the filler 12a connects the lead foils 14 with each other in the bipolar plate 10, notably for a bipolar plate 10 having a PCB 12 insulative substrate. The lead foils 14 are either painted or laid over the exterior surfaces of the PCB 12, as shown in FIG. 2. However, it is possible that the PCB 12 is manufactured with lead conductive layers on the surface, these lead layers being the lead foils 14 of the bipolar battery according to the invention. If the lead foils 14 are not integrally prepared on PCB 12, then the lead foils 14 may be manufactured with perforations that match the perforations 13 in the PCB 12. As described above, if the lead foils 14 cover any of the plurality of perforations 13, then the lead foils 14 may be modified to clear the plurality of perforations 13, so that the filler 2a can be received in and through the perforations 13. In another embodiment, as shown in FIG. 9, the lead foils 14 and the PCB 12 are received and secured within the substrate receiving passageways 11a of the frame 11. During manufacturing, the frame 11, the PCB 12, and the lead foils 14 are constructed into a one piece structure with the frame 11 securely holding the PCB 12 and lead foils 14 there in. Again, this can be performed through a process such as insert molding, or other known manufacturing methods.

In either case, the perforations 13 can vary in size, shape, or grid pattern, but are large enough that the lead foil 14 can be positioned in and through the perforations 13 and connected to an adjacent lead foil 14. If the perforations 13 are not from the existing vias in the PCB 12, the perforations 13 can be molded or milled into the PCB 12 during manufacturing. The lead foils 14 are shown, being positioned on the both exposed surfaces of the PCB 12, and dimensions to fit within the material receiving passageways 11b of the frame 11. The lead foil 14 is dimensioned to securely fit in the material receiving passageway 11b, such that the frame 11 encases each lead foil 14 positioned on both sides of the PCB 12. The leads foils 14 are mechanically and electrically connected through the filler 12a through the perforations 13, as shown in FIG. 7.

In another embodiment, the lead foils 14 may be inserted into the substrate receiving passageways 11a, along with the PCB 12 during manufacturing and assembly. The lead foils 14 may be encased within the frame during insert molding, over molding, or similar manufacturing technique where the lead foils 14 and PCB 12 are manufactured within the substrate receiving passageways 11a. The lead foils 14 are positioned on opposite surfaces of the PCB 12 and then either inserted or manufactured within the frame 11. It is possible to apply the lead foils 14 by known plating, vapor deposition, or cold flame spray methods.

It is also possible that the lead foil 14 is a paste having lead, which is positioned along the front and rear surfaces of the PCB 12. The paste is spread across opposite surfaces (i.e. front and rear surfaces) of the PCB 12. The lead foils 14 as paste with the filler 12a connects both sides of the PCB 12 through the perforations 13. The paste would be thick enough to provide connectivity between the pastes on each side, but should not be thicker than the material receiving passageway 11b, considering an active material 16, 18 is also positioned within the material receiving passageway 11b.

The conductors 40 have a body 41 and a pair of conductor ends 42, and in the embodiment shown, the conductors are conductive wires that extend through adjacent perforations 13. Accordingly, as shown FIGS. 1 and 2, the pair of conductor ends 42 are positioned through adjacent perforations 13, while the body 41 extends out of the perforations and over the lead foils 14. In the embodiment shown, the pair of conductor ends 42 extend orthogonal to the surface of the PCB 12, while the body extends parallel to the surface of the PCB 12, resulting in a 90 degree connection between the body 41 and the pair of conductor ends 42. In other embodiments, the conductor 40 may take various shapes. In the embodiment shown, the connection of the body 41 and the pair of conductor ends 42 extend out to an outer surface of the first and/or second active materials 16, 18, once they are positioned over the lead foils 14, so that the top surface of the body and an outer surface of the active materials 16, 18 is flush. Therefore, a distance between the outer surface of the first or second active material 16, 18 and the outer surface of the lead foil 14 is substantially equal to a distance between the body 41 and the outer surface of the lead foils 14. In other embodiments, the first and second active materials 16, 18 position over the body 41 of the conductor 40.

While the perforations 13, in the embodiment shown, are positioned in a symmetrical grid pattern the conductors 40 may be arranged in symmetrical patterns. However, the conductors 40, as shown, could be positioned in an asymmetrical grid pattern and randomly attaching to filler 12a in non-adjacent perforations 13. Additionally, in other embodiments, the conductors 40 may attach to non-adjacent perforations 13. It is possible that longer conductors 40 attach to filler 12a in perorations 13 all over the PCB 12. It is also possible that the conductors 40 do not attach to filler 12a in other perforations 13. rather one conductor end 42 is free from attaching to a filler 12a and extends into a first or second active material 16, 18.

The filler 12a fills the plurality of perforations in the PCB 12 and the lead foils 14. The filler 12a is a conductive material, such as solder, that flows at a melting temperature and can be applied through the perforations and then overflows each perforation 13 to prepare a conductive head. This conductive head has a larger diameter than a diameter of the perforation 13 and sits on an outer surface of the lead foil 14. In the embodiment shown, the filler 12a has a mushroom shaped conductive head. This provides a larger conductive surface area as does the addition of the conductors 40. In other embodiments, it is possible to have the conductors 40 extend into the conductive head of the filler 12a, but not through the perforation 13 completely to another side, as long as the filler 12a is conductive.

With reference to FIGS. 2 and 5-8, the active materials 16, 18 are shown and positioned on exposed sides of the lead foils 14, facing away from the PCB 12. The first layer of active material 16 is a positive active material paste (PAM) that is applied over one lead foil 14, while a negative active material (NAM) is applied over the other lead foil 14, which is the second active material 18. In the embodiment shown, the positive active material paste (PAM) and the negative active material (NAM) are paste of lead or lead oxide mixed with sulfuric acid, water, fiber, and carbon. The conductors 40 and filler 12a provide a large conductive surface area for interaction between the first and second active materials 16, 18.

The thickness of the active materials 16, 18 (i.e. NAM and PAM) should not extend outside the material receiving passageway 11b of the frame 11. However, the active materials 16, 18 should cover the filler 12a, and more specifically, the conductive head of the filler 12a. The overall thickness $T_m$ of the PCB 12, lead foils 14, and active materials 16, 18 is less than the thickness $T_f$ of the frame 11.

The frame 11 encases the PCB 12, conductors 40, filler 12a, lead foils 14, and active materials 16, 18. As a result, when assembled the bipolar battery 100 is assembled in stacks of bipolar plates 10, the frame 11 acts as a support and exterior surface for the bipolar battery 100. The number of assembly steps and parts can be minimized.

Figure 4:
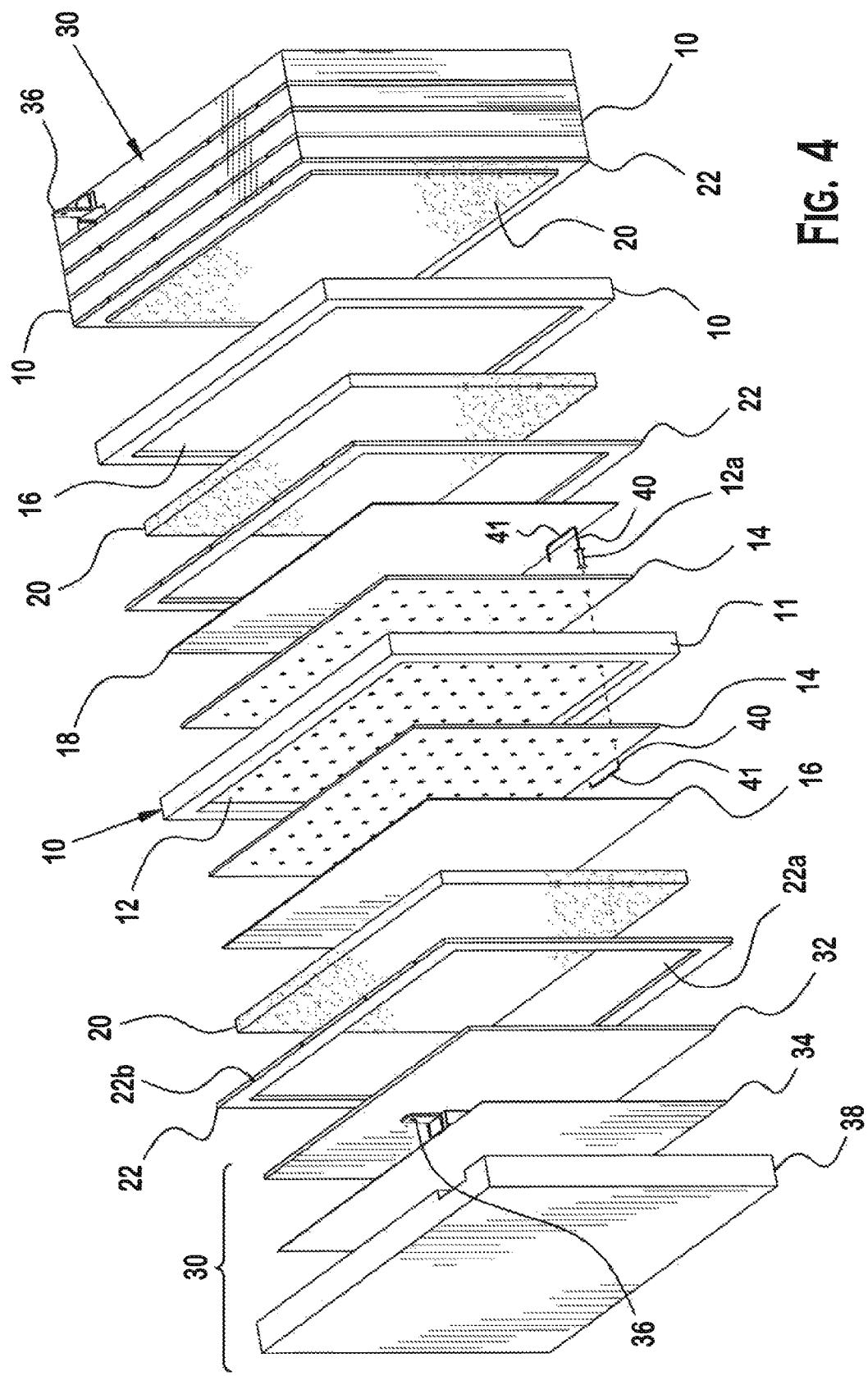
FIG. 4 is an exploded perspective view of the bipolar battery of FIG. 4.

Now with reference to FIGS. 3 and 4, spacers 22 are shown that stack and seal with the bipolar plates 10 according to the invention, and used to hold an electrolyte 20 for the bipolar battery 100.

Figure 5:
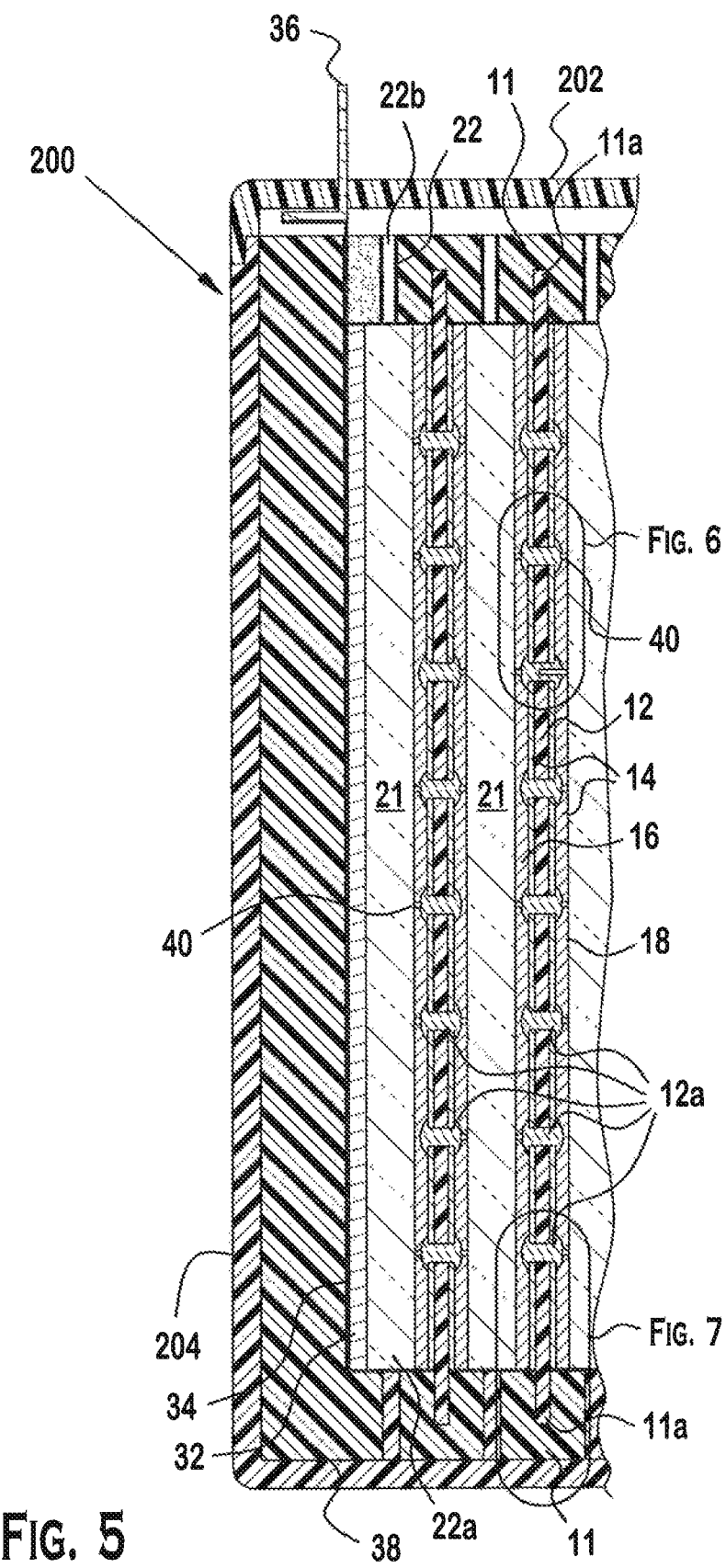
FIG. 5 is a partial sectional view of the bipolar battery according to the invention having a casing.

The spacer 22 is shown between stacking adjacent bipolar plates 10. The spacer 22 is essentially a casing having similar dimensions as the frame 11 and includes an electrolyte receiving space 22a, as shown in FIGS. 5 and 8. The electrolyte receiving space 22a is a hole and is positioned substantially in the center of the spacer 22 and holds electrolyte 20. When sealed between two adjacent bipolar plates 10, the spacer 22 prevents the electrolyte 20 from leaking and allows the electrolyte 20 to provide conductivity between the bipolar plates 10.

As shown in FIGS. 5 and 6, at least one electrolyte receiving channel 22b is provided and extends through the spacer 22. The at least one electrolyte receiving channel 22b is positioned on an outer surface of the spacer 22 and directed into the electrolyte receiving space 22a. A user can provide electrolyte 20 through the electrolyte receiving channel 22b and into the electrolyte receiving space 22a, after the spacer 22 is assembled and sealed with adjacent bipolar plates 10. In general, the electrolyte receiving channel 22b is an opening in the spacer 22 that extends through the spacer 22 and into the electrolyte receiving space 22a. However, other mechanisms or structures known to the art could be used to allow ingress of electrolyte 20 into the electrolyte receiving space 22a. The receiving channel 22b can be plugged or obstructed in some capacity when not utilized, or used to vent gases from the electrolyte receiving space 22a.

The electrolyte 20 may be a variety of substances, including acid. However, the substance should be a substance that includes free ions that make the substance electrically conductive. The electrolyte 20 may be a solution, a molten material, and/or a solid, which helps create a battery circuit through the electrolyte's ions. In the bipolar battery 100 according to the invention, the active materials 16, 18 provide a reaction that converts chemical energy to electrical energy, and the electrolyte 20 allows the electrical energy to flow from the bipolar plate 10 to another bipolar plate 10, as well as to electrodes 36 of the battery 100. The conductors 40 and filler 12a promote conductivity through the PCB 12.

In the embodiment shown, the electrolyte 20 is an acid that is held in an absorbed glass mat (AGM) 21, as shown in FIGS. 4, 5, and 8. The electrolyte 20 is held on the glass mat 21 by way of capillary action Very thin glass fibers are woven into the glass mat 21 to increase surface area enough to hold sufficient electrolyte 20 on the cells for their lifetime. The fibers that include the fine glass fibers glass mat 21 do not absorb nor are affected by the acidic electrolyte 20 they reside in. The dimension of the glass mat can be varied in size. However, in the embodiment shown, the glass mat 21 fits within the electrolyte receiving space 22a, but has a greater thickness than that the spacer 22. Additionally, the electrolyte receiving space 22a, in the embodiment shown, includes additionally space for a portion of the electrolyte 20, and more specifically the glass mat 21. As a result, the design of the bipolar battery 100, according to the invention, allows for the spacer 22 holding the glass mat 21 to uniformly stack with adjacent bipolar plates 10, wherein the active materials 16, 18 sit on the glass mat 21 containing the electrolyte 20.

It is also possible that the glass mat 21 is removed, and an electrolyte 20, such as a gel electrolyte, is free to flow between adjacent active materials 16, 18 between adjacent stacked bipolar plates 10 on either side of the spacer 22.

It is also possible, in other embodiments, that the spacer 22 is an extension of the frame 11. In general, the frame 11 includes a deeper material receiving passageway 11b in order to encase the lead foils 14 and active materials 16, 18, as well as electrolyte 20. Furthermore, if the frame 11 may be dimensioned such that the material receiving passageways 11b of stackable bipolar plates 10 can also hold an fiber glass mat 21 between each other, enclosing and encasing the conductors 40 and filler 12a positioned through the PCB 12, the lead foils 14, first and second active materials 16, 18, glass mat 21, and electrolyte 20 within the stacked and sealed bipolar plates 10. The frame 11 may include the electrolyte receiving channel 22b that extends through the frame and into the material receiving passageway 11b. In this embodiment, the bipolar plates 10 can be stacked onto each other and sealed.

Now with reference to FIGS. 4-6, the terminal sections 30 of the bipolar battery 100 will be discussed, which cap the ends of the bipolar battery 100. The terminal sections 30 stack on opposite sides of stacked bipolar plates 10, the number of bipolar plates 10 stacked next to each other depends on the electrical potential required of a specific battery design and shape.

Each terminal section 30 includes a layer of supplemental active material 32, a terminal plate 34, an electrode 36, and an end plate 38. The end plates 38 are positioned on opposite ends of the stacked bipolar plates 10, with the supplemental active material 32, the terminal plate 34 and electrode 36 positioned within the end plate 38.

The supplemental active material 32 provides increased electrical flow through the bipolar battery 100, from one terminal section 30 to the other terminal section 30. The supplemental active material 32 is made of material that interacts with an adjacent active material 16, 18 from an adjacent bipolar plate 10. Since a spacer 22 and electrolyte 20, as described above, is positioned on each stackable side of the bipolar plates 10, a spacer 22 is positioned between the terminal section 30 and an outside bipolar plate 10. As a result, ions can freely flow through the electrolyte 20 and onto the supplemental active material 32 of the terminal section 30.

As shown in FIGS. 4, 5, and 8, the terminal plate 34 is provided and encased within the terminal section 30. The terminal plate 34 is conductive and generally a metal. The terminal plate 34 attaches to an electrode 36, which either an anode or a cathode of the bipolar battery 100. The anode is defined as the electrode 36 at which electrons leave the cell and oxidation occurs, and the cathode as the electrode 36 at which electrons enter the cell and reduction occurs. Each electrode 36 may become either the anode or the cathode depending on the direction of current through the cell. It is possible that both the terminal plate 34 and the electrode 36 are formed as one piece.

In the embodiment shown, the end plate 38 is non-conductive and provides structural support to ends of the bipolar battery 100 according to the invention. The end plate 38 includes a terminal receiving passageway 38a, which is a recess in which the terminal plate 34, electrode 36, and supplemental active material 32 are positioned. Additionally, like the material receiving passageway 11b, the terminal receiving passageway 38a provides enough clearance for an amount of electrolyte 20 to be encased with the terminal section 30, and specifically within the material receiving passageway 11b along with the supplemental active material 32, terminal plate 34, and electrode 36. In the embodiment shown in FIGS. 5 and 6, the terminal receiving passageway 38a provides enough space to receive and enclose a portion of the glass mat 21, as well.

With reference to FIGS. 3 through 8, the assembly of the bipolar battery 100 according to the invention will be further discussed.

The bipolar plate 10 is manufactured and assembled with the PCB 12 secured with the frame 11. The PCB 12 includes perforations 13, and is generally molded with the frame 11, either as a single or separate component. Once the PCB 12 is positioned within the frame 11, the lead foils 14 are positioned with the material receiving passageways 11b of the frame 11 on both exposed surfaces of the PCB 12. The lead foils 14 are electrically connected together through the filler 12a filling the perforations 13 and the conductors 40 with the filler 12a spread out over the exterior surface of the lead foil 14 in the embodiment shown, such that a conductive head is formed. The conductive head has a larger diameter than the diameter of the perforation 13 through which the filler 12a is positioned in the embodiment shown. Additionally, the conductors 40 provide further conductivity and conductivity surface area between the lead foils 14, the filler 12a, and the conductors 40 for the active materials 16, 18 that are positioned in the material receiving passageways 11b on both sides of the PCB 12. The active layer 16, 18 thickness is larger than a thickness of the conductive head of the filler 12a positioned on the exterior surface of the lead foil 14, but is generally equal to the height of the body 41 or the conductor 40. As a result, the frame 11 encases the substrate 12, lead foils 14, and active materials 16, 18 within surface boundaries of the bipolar plate 10.

The bipolar plates 10 are then stacked next to each other with spacers 22 provided between each stacked bipolar plate. Next, electrolyte 20 is provided in the electrolyte receiving space 22a, which is dimensioned similar to the material receiving passageway 11b of the frame 11. A fiber glass mat 21 can be provided in the electrolyte receiving space 22a, as well, and an electrolyte 20 is provided into the fiber glass mat 21 through the electrolyte receiving channel 22b. The spacers 22 and bipolar plates 10 evenly stack one next to the other, and are subsequently sealed. Since the spacers 22 and stacked bipolar plates 10 include non-conductive outer surfaces, the spacers 22 and frames 11 of the bipolar plates 10 create an outer shell for the bipolar battery 100. The frames 11 of the bipolar plates 10 and spacers 22 can be secured to each other by any method known to the art such that the touching surfaces of the spacers 22 and the frame 11 are secured to each other and sealed. For instance, an adhesive can be used to connect and seal the surfaces together. Additionally, once the terminal sections 30 are assembled, they may be positioned on the stacked bipolar plates 10 and spacers 22, and then sealed in the same manner.

It is also possible, that the end plates 38, the spacer 22, and the frame 11 include securing mechanisms (not shown), such as joint technique or fastener, to connect the pieces of the bipolar battery 100 together. Then a sealant may be applied to provide a seal around the bipolar battery 100, and more specifically, a seal around the connecting end plates 38, spacers 22, and frame 11.

It is also possible, that the bipolar plates 10 are stacked and secured next to each other without a spacer 22. However, the material receiving passageway 11b should be large enough to hold and encase the lead foils 14, active materials 16, 18 and an electrolyte 20, including a fiber glass mat 21, when the stacked bipolar plates 10 are sealed together. Furthermore, the frame 11 should include at least one electrolyte receiving channel 22b positioned in an extension of the frame 11, so that electrolyte 20 can be provided into the material receiving passageway 11b of the frame 11, or allow venting of the electrolyte 20.

The number of bipolar plates 10 used in the bipolar battery 100 is a matter of design choice, dependent upon the size of battery 100 and the electrical potential required. In the embodiment shown, there are at least three bipolar plates 10 stacked next to each other. On opposites ends of the stacked bipolar plates 10 and electrolyte 20 are terminal sections 30, which include a layer of supplemental active material 32, a terminal plate 34 and electrode 36, as well as an end plate 38. In the embodiment shown, the outer surfaces of the spacer 22 and the frame 11 are substantially flush with each other when stacked and sealed. This design provides a smooth outer support surface. However, it is possible that irregularities in the surface may exist. For instance, the spacer 22 may be larger than the frame 11; however, the electrolyte receiving space 22a cannot be larger than the frame 11. Additionally, the material receiving passageway 11b cannot be larger than the spacer 22. In either case, it may be difficult to seal the spacer 22 and bipolar plates 10, and the electrolyte 20 could leak from the bipolar battery 100 after assembly and the electrolyte 20 is positioned between adjacent bipolar plates 10.

Furthermore, when the end plate 38 is stacked next to an adjacent spacer 22 and/or frame 11 of an adjacent bipolar plate 10, the outer surfaces of end plate 38, the spacer 22 and the frame 11 should be substantially flush. However, it is possible that irregularities in the surface may exist. For instance, the end plate 38 may be a bit larger than the spacer 22, which may be larger than the frame 11. Nonetheless, terminal receiving passageway 38a should not be larger than the receiving channel 22b or the frame 11. Additionally, the terminal receiving passageway 38a should not be larger than the material receiving passageway 11b or the frame, or the end plate 38 should not be smaller than then the spacer 22. In either case, the electrolyte 20 may leak from the bipolar battery 100 after assembly and the electrolyte 20 is provided between stacked bipolar plates 10. In general, the frame 11 supports the bipolar plate 10, encasing the PCB 12, lead foils 14, filler 12a and active materials 16, 18, as well as electrolyte. When stacked, the bipolar plates 10, with adjacent spacers 22 and stacked terminal sections 30 provide an outer support surface for the bipolar battery 100. This construction provides a bipolar battery 100 having a simplified designed, having fewer manufacturing steps and fewer parts than required in the prior art. Since the frame 10, spacer 22, and end plate 38 are insulative plastic and moldable, the bipolar battery 100 can be customized to accommodate shape and size requirements dependent on electrical potential and use.

In another embodiment, as shown in FIG. 5, a protective casing 200 is further provided, than encloses the bipolar battery 100 according to the invention. The casing 200 would include body 202, a cover 204, and an electrode receiving space 206, in order for the electrode 36 to extend out of the casing 200. Unlike an external structure of the bipolar battery 100, the casing 200 can be used to house the bipolar battery 100 and provide greater protection.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A bipolar battery plate for a bipolar battery, comprising:
   a frame;
   a substrate positioned within the frame and having a plurality of perforations sealed by a filler;
   a conductor, including a body extending parallel with respect to a surface side of the substrate, held by the filler and connecting of the plurality of perforations;
   a first lead layer positioned on one side of the substrate;
   a second lead layer positioned on another side of the substrate, the first and second lead layers electrically connected to each other through the filler;
   a positive active material (PAM) positioned on a surface of the first lead layer; and
   a negative active material (NAM) positioned on a surface of the second lead layer.

2. The bipolar battery plate according to claim 1, wherein the conductor extends from one of the plurality of perforations and across the substrate to another of the plurality of perforations.

3. The bipolar battery plate according to claim 2, wherein the filler is conductive and includes a head having a diameter larger than a diameter of each of the plurality of perforations through which the filler is positioned.

4. The bipolar battery plate according to claim 3, wherein the conductor further includes a pair of conductor ends that extend perpendicular with respect to the surface side of the substrate, wherein the pair of conductor ends orthogonally connect with the body.

5. The bipolar battery plate according to claim 2, wherein the body is positioned above the surface of the first and second lead layers and extends into the positive and negative active materials.

6. The bipolar battery plate according to claim 5, wherein a top surface of the body is flush with an outer surface of the positive active material or the negative active material.

7. The bipolar battery plate according to claim 2, wherein the filler is an insulator and one conductor end extends from the surface side of the substrate through one of the plurality of perforations to another surface side of the substrate.

8. The bipolar battery plate according to claim 1, wherein the frame is a moldable insulative polymer.

9. The bipolar battery plate according to claim 1, wherein the frame is an outer wall of the bipolar battery that provides structural support for the bipolar battery.

10. The bipolar battery plate according to claim 1, wherein the frame includes substrate receiving passageways.

11. The bipolar battery plate according to claim 10, wherein the frame includes material receiving passageways.

12. The bipolar battery plate according to claim 11, wherein the substrate receiving passageways secure the substrate within the frame.

13. The bipolar battery plate according to claim 12, wherein the material receiving passageways are areas between outer surfaces of the frame and a surface of the substrate.

14. The bipolar battery plate according to claim 13, wherein the substrate is a separate piece of insulative material than the frame, and the substrate is received and secured within the substrate receiving passageways of the frame.

15. The bipolar battery plate according to claim 1, wherein the substrate is a printed circuit board (PCB) having a non-conductive middle layer.

16. The bipolar battery plate according to claim 15, wherein the plurality of perforations are existing vias in a PCB positioned along and extending through the substrate.

17. The bipolar battery plate according to claim 16, wherein the first and second lead layers are conductive lead foils formed on the printed circuit board (PCB) and conductive through the filler sealing the plurality of perforations.

18. The bipolar battery plate according to claim 1, wherein the positive and negative active materials are positioned over the first and second lead layers respectively within a material receiving passageway of the frame.

19. The bipolar battery plate according to claim 18, wherein positive active material is a paste applied over the first lead layer and the negative active material is a paste spread over the second lead layer, the filler extending into the positive and negative active materials.

20. A bipolar battery, comprising
   a plurality of bipolar plates positioned next to each other, each plate having,
   a frame;
   a substrate positioned within the frame and having a plurality of perforations sealed by a filler;
   a conductor, including a body extending parallel with respect to a surface side of the substrate, held by the filler and connecting the plurality of perforations;
   a first lead layer positioned on one side of the substrate;
   a second lead layer positioned on another side of the substrate, the first and second lead layers electrically connected to each other through the filler;
   a positive active material (PAM) positioned on a surface of the first lead layer; and
   a negative active material (NAM) positioned on a surface of the second lead layer;
   a pair of terminal sections positioned on opposite ends of the plurality of bipolar plates positioned next to each other; and
   an electrolyte positioned between each of the plurality of bipolar plates and the pair of terminal sections.

21. The bipolar battery according to claim 20, wherein the conductor extends from one of the plurality of perforations and across the substrate to another of the plurality of perforations.

22. The bipolar battery according to claim 20, wherein the filler is conductive and includes a head having a diameter larger than a diameter of each of the plurality of perforations through which the filler is positioned.

23. The bipolar battery according to claim 22, wherein the conductor further includes a pair of conductor ends that extend perpendicular with respect to the surface side of the substrate, wherein the pair of conductor ends orthogonally connect with the body.

24. The bipolar battery according to claim 20, wherein the body is positioned above the surface of the first and second lead layers and extends into the positive and negative active materials.

25. The bipolar battery according to claim 24, wherein a top surface of the body is flush with an outer surface of the positive active material or the negative active material.

26. The bipolar battery according to claim 20, wherein the filler is an insulator and one conductor end extends from the surface side of the substrate through one of the plurality of perforations to another surface side of the substrate.

27. The bipolar battery according to claim 20, wherein the frame is a moldable insulative polymer.

28. The bipolar battery according to claim 20, wherein the frame is an outer wall of the bipolar battery that provides structural support for the bipolar battery.

29. The bipolar battery according to claim 20, wherein the frame includes substrate receiving passageways.

30. The bipolar battery according to claim 29, wherein the frame includes material receiving passageways.

31. The bipolar battery according to claim 30, wherein the substrate receiving passageways secure the substrate within the frame.

32. The bipolar battery according to claim 31, wherein the material receiving passageways are areas between outer surfaces of the frame and a surface of the substrate.

33. The bipolar battery according to claim 32, wherein the substrate is a separate piece of insulative material than the frame, and the substrate is received and secured within the substrate receiving passageways of the frame.

34. The bipolar battery according to claim 20, wherein the substrate is a printed circuit board (PCB) having a non-conductive middle layer.

35. The bipolar battery according to claim 34, wherein the plurality of perforations are existing vias in a PCB positioned along and extending through the substrate.

36. The bipolar battery according to claim 35, wherein the first and second lead layers are conductive lead foils formed on the printed circuit board (PCB) and conductive through the tiller sealing the plurality of perforations.

37. The bipolar battery according to claim 20, wherein the positive and negative active materials are positioned over the first and second lead layers respectively within a material receiving passageway of the frame.

38. The bipolar battery according to claim 37, wherein positive active material is a paste applied over the first lead layer and the negative active material is a paste spread over the second lead layer, the filler extending into the positive and negative active materials.

39. A bipolar battery plate for a bipolar battery, comprising:
a frame;
a substrate positioned within the frame and having a plurality of perforations arranged in a symmetrical grid pattern and sealed by a filler;
a conductor held by the filler and connecting the perforations;
a first lead layer positioned on one side of the substrate;
a second lead layer positioned on another side of the substrate, the first and second lead layers electrically connected to each other through the filler;
a positive active material (PAM) positioned on a surface of the first lead layer; and
a negative active material (NAM) positioned on a surface of the second lead layer.

40. The bipolar battery plate according to claim 39, wherein the conductor extends from one of the plurality of perforations and across the substrate to another of the plurality of perforations.

41. The bipolar battery plate according to claim 40, wherein the conductor includes a body extending parallel with respect to a surface side of the substrate.

42. The bipolar battery plate according to claim 41, wherein the filler is conductive and includes a head having a diameter larger than a diameter of each of the plurality of perforations through which the filler is positioned.

43. The bipolar battery plate according to claim 42, wherein the conductor further includes a pair of conductor ends that extend perpendicular with respect to the surface side of the substrate, wherein the pair of conductor ends orthogonally connect with the body.

44. The bipolar battery plate according to claim 41, wherein the body is positioned above the surface of the first and second lead layers and extends into the positive and negative active materials.

45. The bipolar battery plate according to claim 44, wherein a top surface of the body is flush with an outer surface of the positive active material or the negative active material.

46. The bipolar battery plate according to claim 41, wherein the filler is an insulator and one conductor end extends from the surface side of the substrate through one of the plurality of perforations to another surface side of the substrate.

47. The bipolar battery plate according to claim 39, wherein the frame is a moldable insulative polymer.

48. The bipolar battery plate according to claim 39, wherein the frame is an outer wall of the bipolar battery that provides structural support for the bipolar battery.

49. The bipolar battery plate according to claim 39, wherein the frame includes substrate receiving passageways.

50. The bipolar battery plate according to claim 49, wherein the frame includes material receiving passageways.

51. The bipolar battery plate according to claim 50, wherein the substrate receiving passageways secure the substrate within the frame.

52. The bipolar battery plate according to claim 51, wherein the material receiving passageways are areas between outer surfaces of the frame and a surface of the substrate.

53. The bipolar battery plate according to claim 52, wherein the substrate is a separate piece of insulative material than the frame, and the substrate is received and secured within the substrate receiving passageways of the frame.

54. The bipolar battery plate according to claim 39, wherein the substrate is a printed circuit board (PCB) having a non-conductive middle layer.

55. The bipolar battery plate according to claim 54, wherein the plurality of perforations are existing vias in a PCB positioned along and extending through the substrate.

56. The bipolar battery plate according to claim 55, wherein the first and second lead layers are conductive lead foils formed on the printed circuit board (PCB) and conductive through the filler sealing the plurality of perforations.

57. The bipolar battery plate according to claim 39, wherein the positive and negative active materials are positioned over the first and second lead layers respectively within a material receiving passageway of the frame.

58. The bipolar battery plate according to claim 57, wherein positive active material is a paste applied over the first lead layer and the negative active material is a paste spread over the second lead layer, the filler extending into the positive and negative active materials.

* * * * *

UNITED STATES PATENT AND TRADEMARK OFFICE
CERTIFICATE OF CORRECTION

PATENT NO.        : 8,597,817 B2
APPLICATION NO.   : 13/229331
DATED             : December 3, 2013
INVENTOR(S)       : Thomas Faust Page 1 of 1

It is certified that error appears in the above-identified patent and that said Letters Patent is hereby corrected as shown below:

In the Claims:

In column 11, line 33, after "connecting", delete "of".

Signed and Sealed this
Sixth Day of May, 2014

Michelle K. Lee
*Deputy Director of the United States Patent and Trademark Office*